United States Patent [19]
Dorgnon

[11] 3,965,794
[45] June 29, 1976

[54] EXPANDABLE PLUG
[76] Inventor: Roger Dorgnon, Avenue de St. Romains de Lerps 07130, Saint Peray, France
[22] Filed: Mar. 10, 1975
[21] Appl. No.: 557,212

[30] Foreign Application Priority Data
Mar. 13, 1974 France .............................. 74.08467

[52] U.S. Cl. ...................................... 85/77; 248/216
[51] Int. Cl.² ......................................... F16B 13/06
[58] Field of Search ................ 85/77, 78, 79, 73–76, 85/82–84, 8.1; 248/216, 217, 71, 343, 342; 61/45 B

[56] References Cited
UNITED STATES PATENTS
657,491    9/1900    James et al. ..................... 248/217

2,771,746    11/1956    Fischer et al. ..................... 61/45 B
3,455,199    7/1969    Semanchik ..................... 248/216 X FOREIGN PATENTS OR APPLICATIONS
1,261,651    2/1968    Germany .............................. 85/75

Primary Examiner—Ramon S. Britts
Attorney, Agent, or Firm—Donald R. Motsko; William W. Jones

[57] ABSTRACT

An expandable plug or anchor having a diametrical hole in either the socket member or male member or both. The location of the hole or holes is such that unless the proper amount of relative movement between the socket member and male member necessary to properly expand the plug is effected, the hole or holes are blocked and a wire cannot be passed through the hole and be attached to the plug.

5 Claims, 2 Drawing Figures

U.S. Patent   June 29, 1976   3,965,794
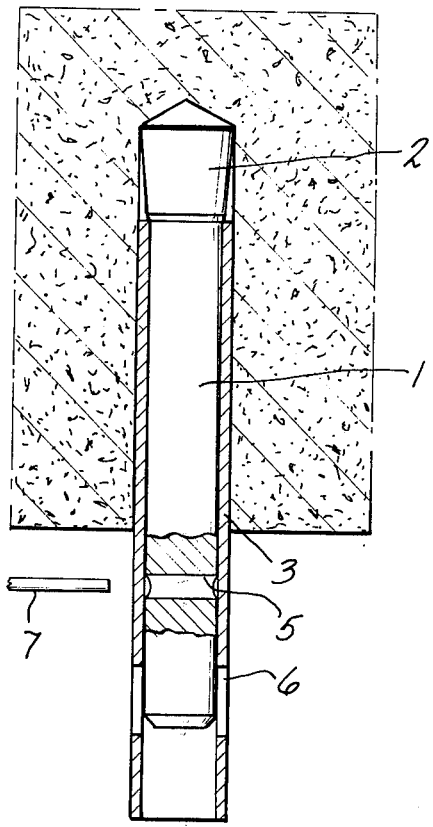
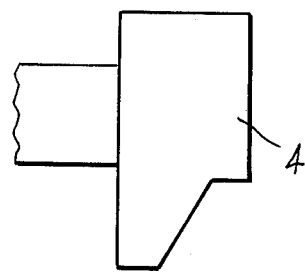
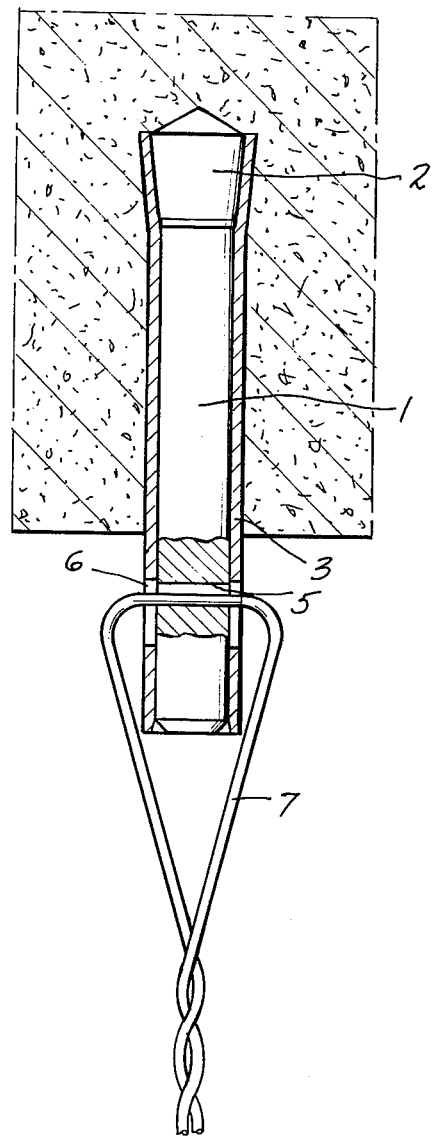
FIG-1    FIG-2

EXPANDABLE PLUG

The invention relates to an expandable plug or anchor for use as an attachment for a cable or wire.

Such plugs or anchors may be used to provide an attachment point in a ceiling to which a wire or cable can be tied to suspend a false ceiling, light fixtures, various types of conduits or other items.

In general expandable plugs comprise a cylindrical socket and a male member located in the socket, whereby the relative displacement of socket and male member lead to an expansion of part of the plug and therefore to its anchoring in a hole in the material to which it is to be attached.

When the plug is intended to serve as a passage for a cable, the projecting part of the socket or the projecting part of the male member has a hole through which the cable can be passed and tied.

In all cases it is difficult to ensure that adequate anchoring, i.e. an adequate relative displacement of the socket and male member, has taken place.

The object of the invention is to eliminate this disadvantage.

To this end either the male member or the socket is provided with diametrical holes arranged so that they cannot be used for the passage of a cable until there has been a predetermined relative displacement of the socket and the male member corresponding to a predetermined expansion of the plug. Therefore, the plug according to the invention does not permit the passage of the cable until there has been a predetermined expansion of the plug, thereby ensuring a satisfactory anchoring.

Preferably when both the socket and male member are provided with diametrical holes, the socket holes are axially elongated which makes it possible to obtain a small relative positioning tolerance and in particular, when the plug is being used, the transfer of stress by the core which permits a possible automatic expansion.

The invention will be better understood from reading the following description with reference to the attached drawing wherein:

FIG. 1 is an elevational view, partly in section, of an embodiment of a plug according to the invention prior to its expansion;

FIG. 2 is a view similar to FIG. 1, but showing the plug after proper expansion has taken place and the cable inserted.

In the preferred embodiment the plug comprises a male member 1 with a frustrum-shaped expander head 2 and a cylindrical socket 3 which slides on member 1 and whose end adjacent to head 2 has one or several expansion joints. After drilling a hole in the material, the plug is inserted therein until the point of head 2 strikes against the bottom of the hole. By striking the free end of socket 3 with hammer 4, the socket 3 is driven in and its split end forced over the frustrum-shaped expander head 2 so that the split end expands and tightly engages the wall of the hole.

According to the invention the male member 1 has a diametrical hole 5 while socket 3 has an axially elongated diametrical hole 6. Only after a predetermined total driving in of the socket 3 relative to male member 1 can holes 5 and 6 be made to align with one another (FIG. 2). This corresponds to an adequate anchoring and the cable 7 can be passed through both members and attached to the plug.

In the event that the proper amount of relative displacement between the socket 3 and the male member 1 is not effected, to ensure proper expansion, the holes 5 and 6 will not be in alignment and the cable cannot be passed through the members 1 and 3 and attached to the plug.

Various other arrangements can be provided in accordance with this invention to effect the same result. For example, if the male member is used as the driving member, such as in the case where the interior of the socket is provided with a tapered surface for engagement by the male member, only the socket member need be provided with the diametrical hole. In this case, the male member should be of such a length that it will normally block the hole in the socket member until it has been driven in a sufficient distance to properly expand the plug. It is also conceivable that only the male member be provided with a hole and the socket member of such a length that it will block the hole until it has been driven in the required amount.

It will be apparent that various modifications and alterations will readily suggest themselves to those skilled in the art. Accordingly, it is intended that the scope of this invention be ascertained from the following claims.

What is claimed:

1. An expandable plug for use as an attachment point for a cable or the like comprising a cylindrical socket member, one end of said socket member being split to form at least one joint which expands into tight engagement with the wall of a hole formed in a supporting material to set the plug in the supporting material, a male member located in said socket, means on at least one of said members for causing expansion of said one end of said socket member upon relative axial movement of the members in one directon to set the plug, at least one of said members being provided with a diametrical hole for reception of a cable or the like, said members each being predetermined lengths such that one of the members prevents a cable or the like from being passed through said hole until a predetermined amount of relative axial movement sufficient to set the plug in said one direction has taken place between said members.

2. The plug of claim 1 wherein both the socket member and male member are both provided with a diametrical hole.

3. The plug of claim 2 wherein the hole in said socket member is axially elongated.

4. The plug of claim 1 wherein said socket member is provided with said hole and said male member is of such a length that it blocks passage through the hole in said socket member until it is driven a predetermined distance relative to said socket member to expand said plug.

5. The plug of claim 1 wherein said male member is provided with said hole and the socket member is of such a length that it blocks passage through said hole until the socket member has been moved relative to said male member a predetermined distance to expand said plug.

* * * * *